US011196355B2

(12) United States Patent
Ido et al.

(10) Patent No.: US 11,196,355 B2
(45) Date of Patent: Dec. 7, 2021

(54) POWER CONVERSION APPARATUS HAVING AUTONOMOUS GENERATION OF IDENTIFICATION INFORMATION BY EACH SUB-MODULE

(71) Applicant: Mitsubishi Electric Corporation, Tokyo (JP)

(72) Inventors: Yasunori Ido, Tokyo (JP); Hideaki Ohashi, Tokyo (JP); Noriyuki Imada, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/763,384

(22) PCT Filed: Jan. 22, 2018

(86) PCT No.: PCT/JP2018/001796
§ 371 (c)(1),
(2) Date: May 12, 2020

(87) PCT Pub. No.: WO2019/142361
PCT Pub. Date: Jul. 25, 2019

(65) Prior Publication Data
US 2021/0075339 A1 Mar. 11, 2021

(51) Int. Cl.
*H02M 7/537* (2006.01)
*H02M 1/08* (2006.01)

(52) U.S. Cl.
CPC ............. *H02M 7/537* (2013.01); *H02M 1/08* (2013.01)

(58) Field of Classification Search
CPC ........ H02M 7/49; H02M 7/537; H02M 7/797; H02M 1/08; H04L 12/28
See application file for complete search history.

(56) References Cited

U.S. PATENT DOCUMENTS

| 2012/0113698 A1* | 5/2012 | Inoue ..................... H02M 1/08 363/123 |
| 2016/0124400 A1 | 5/2016 | Kanayama et al. |

(Continued)

FOREIGN PATENT DOCUMENTS

| CN | 101951162 A | * 1/2011 |
| JP | 2016059185 A | 4/2016 |

(Continued)

OTHER PUBLICATIONS

International Search Report (PCT/ISA/210), with translation, and Written Opinion (PCT/ISA/237) dated Feb. 13, 2018, by the Japan Patent Office as the International Searching Authority for International Application No. PCT/JP2018/001796.

(Continued)

*Primary Examiner* — Kyle J Moody
*Assistant Examiner* — Jye-June Lee
(74) *Attorney, Agent, or Firm* — Buchanan Ingersoll & Rooney PC

(57) ABSTRACT

A power conversion apparatus includes power conversion circuitry including a plurality of sub-modules connected in series to each other, a control device to generate a control command for controlling operation of the plurality of sub-modules, and a relay apparatus to relay communication between the control device and the plurality of sub-modules. For each sub-module of the plurality of sub-modules, the relay apparatus generates path information indicating a communication path from the control device to the sub-module, and outputs the generated path information to the sub-module. Each sub-module of the plurality of sub-modules generates identification information of the sub-module based on the path information corresponding to the sub-module.

19 Claims, 11 Drawing Sheets

(56) References Cited

U.S. PATENT DOCUMENTS

2016/0352208 A1 12/2016 Wien et al.
2020/0127583 A1* 4/2020 Adachi ................ H02M 7/797

FOREIGN PATENT DOCUMENTS

| JP | 2016092898 A | 5/2016 |
| WO | 2011010575 A1 | 1/2011 |
| WO | 2015107187 A1 | 7/2015 |

OTHER PUBLICATIONS

Office Action dated Jul. 10, 2018, by the Japan Patent Office for Application No. 2018-522166.

* cited by examiner

POWER CONVERSION APPARATUS HAVING AUTONOMOUS GENERATION OF IDENTIFICATION INFORMATION BY EACH SUB-MODULE

TECHNICAL FIELD

The present disclosure relates to a power conversion apparatus performing power conversion between AC and DC.

BACKGROUND ART

The Modular Multilevel Converter (MMC) is known as a self-excited power conversion apparatus used in a DC power transmission system. The Modular Multilevel Converter includes, for each phase of AC, an upper arm connected to a high-potential-side DC terminal and a lower arm connected to a low-potential-side DC terminal. Each arm is made up of a plurality of cascaded sub-modules.

For example, WO2011/010575 (PTL 1) discloses a power conversion apparatus including a plurality of cascaded cells. A controller of the power conversion apparatus includes a central controller and a cell controller having the same potential as each cell and disposed in the vicinity of the cell. The central controller and the cell controllers are daisy-chained by an optical fiber cable.

CITATION LIST

Patent Literature

PTL 1: WO2011/010575

SUMMARY OF INVENTION

Technical Problem

For identification and individual control of each sub-module in the MMC, each sub-module has to be allocated with a unique identification number (i.e., that does not overlap identification numbers allocated to other sub-modules).

According to PTL 1, each sub-module is allocated with a predetermined cell number and a predetermined carrier number, and these numbers are used for performing various kinds of control. The cell number and the carrier number of PTL 1, however, are fixed numbers. Thus, each time a system change is made such as a change to the number of sub-modules, for example, a user has to set appropriate numbers for sub-modules again. In particular, because many sub-modules are used for the MMC, if the number setting is done manually, an enormous working time is required by a system operator, which is likely to induce human errors such erroneous number setting.

In an aspect of the present disclosure, an object is to provide a power conversion apparatus that enables reduction of the workload of the system operator by autonomous generation of identification information by each sub-module.

Solution to Problem

In accordance with an embodiment, a power conversion apparatus performing power conversion between a DC circuit and an AC circuit is provided. The power conversion apparatus includes: power conversion circuitry including a plurality of sub-modules connected in series to each other; a control device to generate a control command for controlling operation of the plurality of sub-modules; and a relay apparatus to relay communication between the control device and the plurality of sub-modules. For each sub-module of the plurality of sub-modules, the relay apparatus generates path information indicating a communication path from the control device to the sub-module, and outputs the generated path information to the sub-module. Each sub-module of the plurality of sub-modules includes an identification information generator to generate identification information of the sub-module based on the path information corresponding to the sub-module.

Advantageous Effects of Invention

According to the present disclosure, the workload of the system operator can be reduced by autonomous generation of identification information by each sub-module.

DESCRIPTION OF EMBODIMENTS

Figure 1:
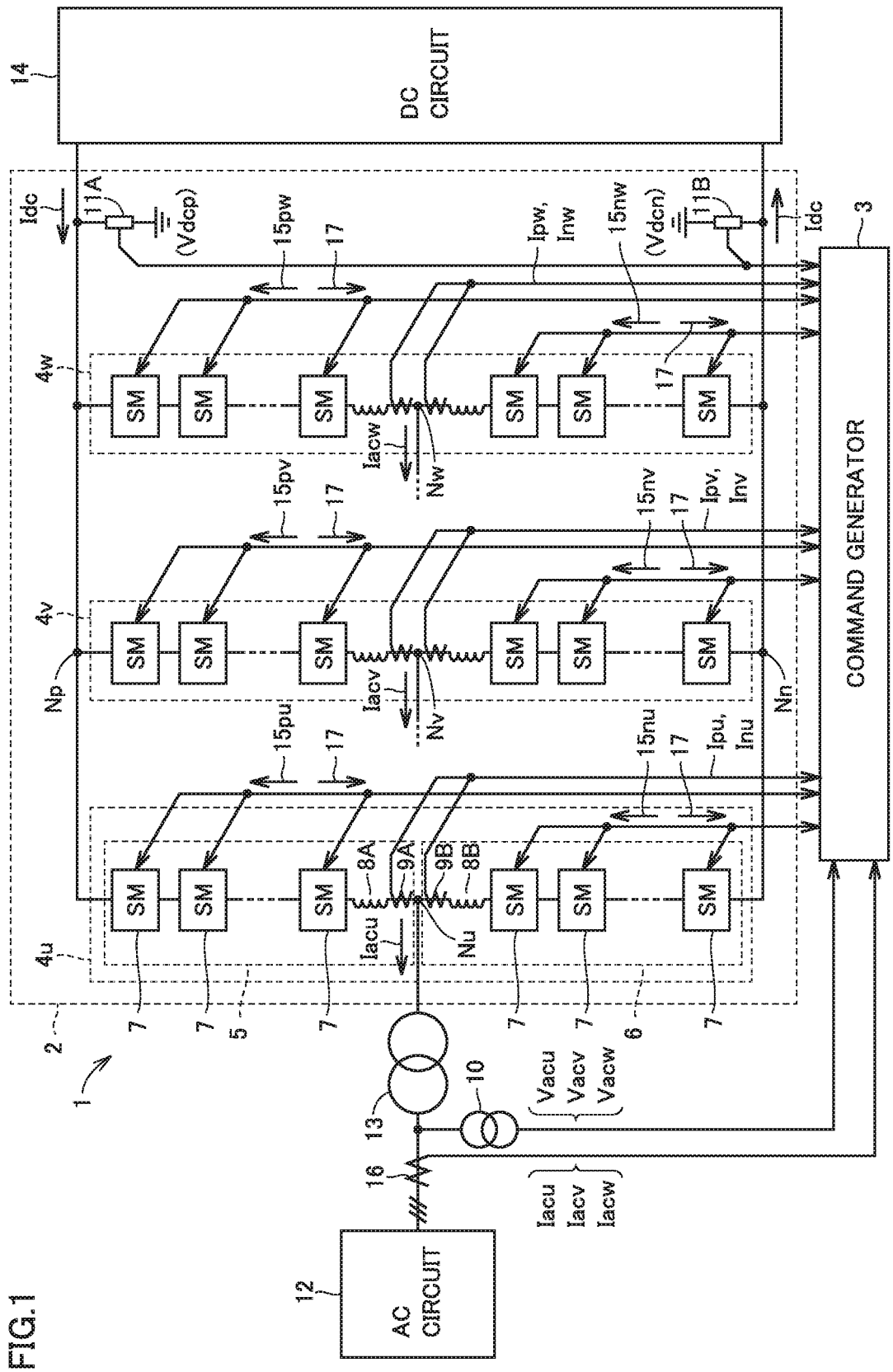
FIG. 1 is a schematic configuration diagram of a power conversion apparatus.

Embodiments of the present invention are described hereinafter with reference to the drawings. In the following description, the same parts are denoted by the same reference characters. They are named identically and function identically. A detailed description of them is therefore not repeated.

[Configuration of Power Conversion Apparatus]

FIG. 1 is a schematic configuration diagram of a power conversion apparatus. Referring to FIG. 1, power conversion apparatus 1 is configured in the form of a modular multilevel converter including a plurality of sub-modules (corresponding to "SM" in FIG. 1) connected in series to each other. "Sub-module" is also called "converter cell" or "unit converter." Power conversion apparatus 1 performs power conversion between a DC circuit 14 and an AC circuit 12. Specifically, power conversion apparatus 1 includes power conversion circuitry 2 and a command generator 3.

Power conversion circuitry 2 includes a plurality of leg circuits 4u, 4v, 4w (referred to as leg circuit 4 where they are mentioned collectively or any of them is mentioned) connected in parallel with each other between a positive DC terminal (i.e., high-potential-side DC terminal) Np and a negative DC terminal (i.e., low-potential-side DC terminal) Nn.

Leg circuit 4 is provided for each of a plurality of phases of AC. Leg circuit 4 is connected between AC circuit 12 and DC circuit 14 for performing power conversion between the AC circuit and the DC circuit. FIG. 1 shows AC circuit 12 of a three-phase AC system, and three leg circuits 4u, 4v, and 4w are arranged respectively for U phase, V phase, and W phase.

AC input terminals Nu, Nv, and Nw arranged respectively in leg circuits 4u, 4v, and 4w are connected to AC circuit 12 through an interconnection transformer 13. AC circuit 12 is an AC power system including an AC power source, for example. For the sake of simplifying illustration, connection between AC input terminals Nv, Nw and interconnection transformer 13 is not shown in FIG. 1.

High-potential-side DC terminal Np and low-potential-side DC terminal Nn connected commonly to leg circuits 4 are connected to DC circuit 14. DC circuit 14 is a DC terminal for a DC power system including a DC transmission network or the like, or a DC terminal for another power conversion apparatus, for example. In the latter case, the two power conversion apparatuses are coupled together to form a BTB (Back To Back) system for connecting AC power systems that are different from each other in the rated frequency, for example.

The leg circuits may be connected to AC circuit 12 through an interconnection reactor, instead of interconnection transformer 13 in FIG. 1. Further, instead of AC input terminals Nu, Nv, Nw, primary windings may be arranged in respective leg circuits 4u, 4v, 4w, and AC connection from leg circuits 4u, 4v, 4w to interconnection transformer 13 or the interconnection reactor may be implemented through secondary windings magnetically coupled with the respective primary windings. In this case, the primary windings may be reactors 8A, 8B as described below. Specifically, leg circuit 4 is connected electrically (DC or AC connection) to AC circuit 12 through respective connecting parts arranged in leg circuits 4u, 4v, 4w, such as AC input terminals Nu, Nv, Vw or the aforementioned primary windings.

Leg circuit 4u includes an upper arm 5 from high-potential-side DC terminal Np to AC input terminal Nu, and a lower arm 6 from low-potential-side DC terminal Nn to AC input terminal Nu. AC input terminal Nu which is a connecting point between upper arm 5 and lower arm 6 is connected to interconnection transformer 13. High-potential-side DC terminal Np and low-potential-side DC terminal Nn are connected to DC circuit 14. Leg circuits 4v, 4w have a similar configuration to the above-described one, and therefore, leg circuit 4u is explained below as a representative of the leg circuits.

Upper arm 5 includes a plurality of cascaded sub-modules 7 and reactor 8A. These sub-modules 7 and reactor 8A are connected in series to each other.

Likewise, lower arm 6 includes a plurality of cascaded sub-modules 7 and reactor 8B. These sub-modules 7 and reactor 8B are connected in series to each other.

The position in which reactor 8A is inserted may be any position in upper arm 5 of leg circuit 4u, and the position in which reactor 8B is inserted may be any position in lower arm 6 of leg circuit 4u. More than one reactor 8A and more than one reactor 8B may be arranged. Respective inductance values of the reactors may be different from each other. Only reactor 8A of upper arm 5, or only reactor 8B of lower arm 6 may be arranged.

Reactors 8A, 8B are arranged for preventing a sharp increase of fault current generated in the event of a fault in AC circuit 12 or DC circuit 14, for example. Excessively large inductance values of reactors 8A, 8B, however, result in a problem that the efficiency of the power conversion apparatus is decreased. It is therefore preferable to stop (turn off) all switching devices in each sub-module 7 as quickly as possible in the event of a fault.

Power conversion apparatus 1 further includes, as detectors for measuring the amount of electricity (current, voltage, for example) to be used for control, an AC voltage detector 10, an AC current detector 16, DC voltage detectors 11A, 11B, and arm current detectors 9A, 9B disposed in each leg circuit 4.

Signals detected by these detectors are input to command generator 3. Based on these detected signals, command generator 3 outputs control commands 15pu, 15nu, 15pv, 15nv, 15pw, 15nw for controlling the operating states of respective sub-modules 7. Command generator 3 also receives a signal 17 from each sub-module 7. Signal 17 includes a detected value of the capacitor voltage (the voltage of a DC capacitor 24 in FIG. 7 described later herein) and abnormality determination information indicating whether sub-module 7 has abnormality or not.

In the case of the present embodiment, control commands 15pu, 15nu, 15pv, 15nv, 15pw, and 15nw are generated for the U phase upper arm, the U phase lower arm, the V phase upper arm, the V phase lower arm, the W phase upper arm, and the W phase lower arm, respectively. In the following description, control commands 15pu, 15nu, 15pv, 15nv, 15pw, 15nw are referred to as control command 15 where they are mentioned collectively or any of them is mentioned.

For the sake of simplifying the illustration, FIG. 1 shows collectively some of signal lines for signals that are input from respective detectors to command generator 3 and signal lines for signals that are input or output between command generator 3 and respective sub-modules 7. Actually, however, the signal line is disposed individually for each detector and each sub-module 7. The signal line between each sub-module 7 and command generator 3 may be provided as separate transmission line and reception line. In the case of the present embodiment, these signals are transmitted through optical fibers for the sake of noise immunity.

In the following, each detector is described specifically. AC voltage detector 10 detects U phase AC voltage value Vacu, V phase AC voltage value Vacv, and W phase AC voltage value Vacw of AC circuit 12. AC current detector 16 detects U phase AC current value Iacu, V phase AC current value Iacy, and W phase AC current value IMacs of AC circuit 12. DC voltage detector 11A detects DC voltage value DC of high-potential-side DC terminal Np connected to DC circuit 14. DC voltage detector 11B detects DC voltage value DC of low-potential-side DC terminal Nn connected to DC circuit 14.

Arm current detectors 9A and 9B disposed in U phase leg circuit 4u detect upper arm current IPDU flowing in upper arm 5 and lower arm current Innu flowing in lower arm 6, respectively. Likewise, arm current detectors 9A and 9B disposed in V phase leg circuit 4v detect upper arm current Ivy and lower arm current In, respectively. Arm current detectors 9A and 9B disposed in W phase leg circuit 4w detect upper arm current Ipw and lower arm current Inw, respectively.

[Configuration of Command Generator]

Figure 2:
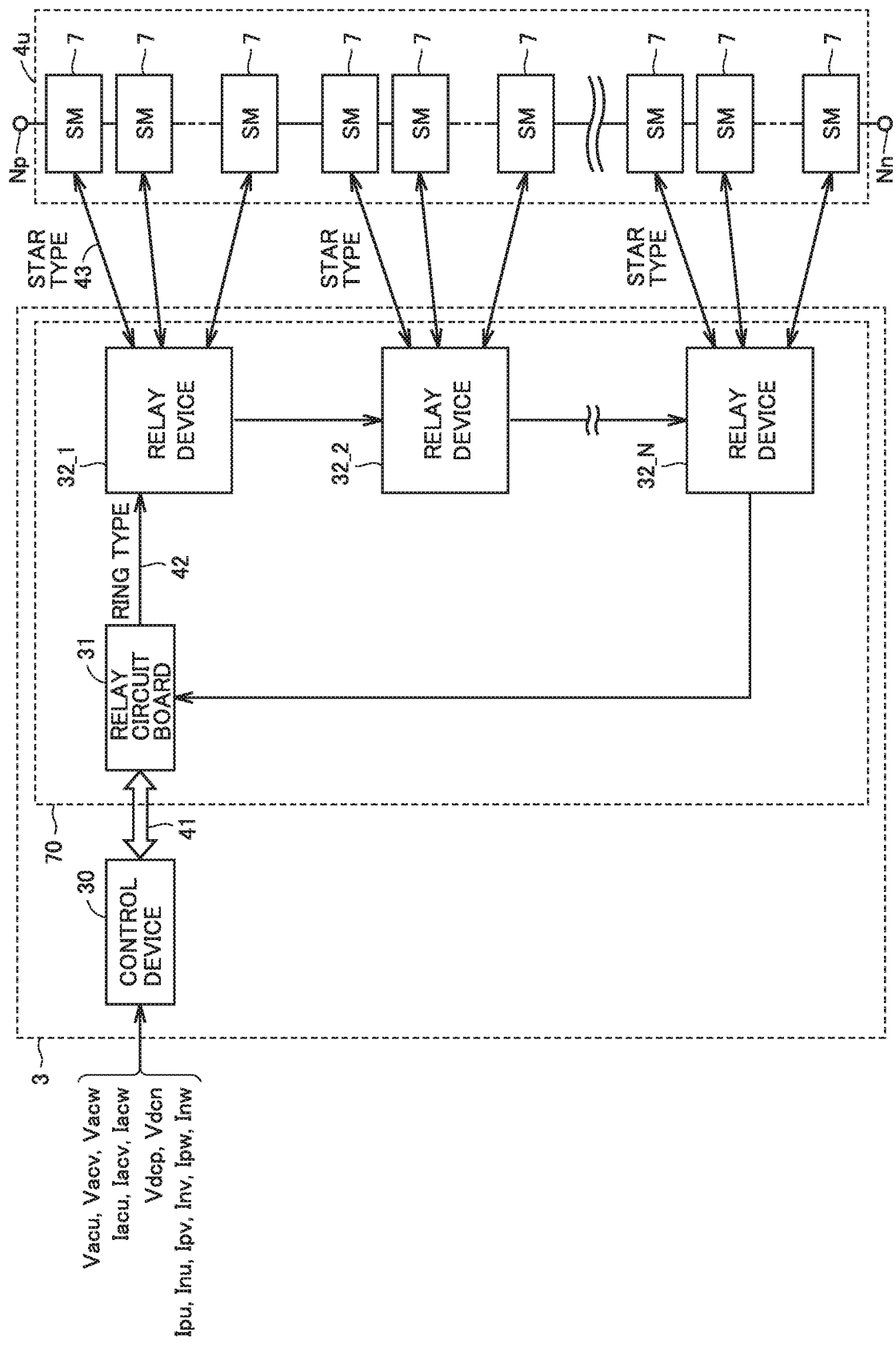
FIG. 2 is a block diagram showing a configuration of a command generator.

FIG. 2 is a block diagram showing a configuration of the command generator. Referring to FIG. 2, command generator 3 includes a control device 30 and a relay apparatus 70. Relay apparatus 70 relays communication between control device 30 and a plurality of sub-modules 7. Specifically, relay apparatus 70 includes a relay circuit board 31 and a plurality of relay devices 32_1 to 32_N. While FIG. 2 exemplarily shows only U-phase leg circuit 4u of power conversion circuitry 2 in FIG. 1, other leg circuits 4v, 4w are similar to leg circuit 4u. For example, relay circuit board 31 is disposed for each phase. Relay devices 32_1 to 32_N are referred to as relay device 32 where they are mentioned collectively or any of them is mentioned.

Control device 30 receives input of AC voltage values Vacu, Vacv, Vacw (referred to as AC voltage value Vac where they are mentioned collectively), AC current values Iacu, Iacy, IMacs (referred to as AC current value Iac where they are mentioned collectively), DC voltage values DC, DC, upper arm currents IPDU, Ivy, Ipw, lower arm currents Innu, In, Inw, and capacitor voltage Vcap that are detected by respective detectors in FIG. 1.

Based on each of the received detected values, control device 30 generates, for each period Ts1 (100 μs), control command 15 for controlling the operation of each sub-module 7 and outputs the generated control command 15 to relay apparatus 70, during a normal operation control period. Capacitor voltage Vcap is determined by averaging, for each arm circuit, respective voltage values of DC capacitors 24 detected in respective sub-modules 7.

Control command 15 includes a voltage command (an output voltage command value for upper arm 5 and an output voltage command value for lower arm 6 in each of leg circuits 4u, 4v, 4w, for example), and a synchronization command for synchronizing respective operations of sub-modules 7. For example, the synchronization command is a synchronization pulse signal with respect to the phase of AC voltage value Vac during a normal operation.

Control device 30 typically includes an auxiliary transformer, an AD (Analog to Digital) converter, and an operating unit, for example, as hardware components. The operating unit includes a CPU (Central Processing Unit), a RAM (Random Access Memory), and a ROM (Read Only Memory). The AD converter includes an analog filter, a sample-and-hold circuit, and a multiplexer, for example. Control device 30 may be configured, for example, in the form of a digital protective relay.

In power conversion apparatus 1, operations of many (approximately 2000, for example) sub-modules 7 are controlled by control device 30. Typically, the number of communication cables that can be connected directly to control device 30 is limited. It is therefore often difficult to directly connect control device 30 to all sub-modules 7. Moreover, even if control device 30 can be connected to all sub-modules 7, an enormous number of communication cables are required, which increases the cost.

In view of this, power conversion apparatus 1 in the present embodiment is equipped with relay apparatus 70 between control device 30 and each sub-module 7. Relay circuit board 31 of relay apparatus 70 is electrically connected to control device 30 via a bus 41. Relay circuit board 31 is connected to a plurality of relay devices 32 via a ring-type network 42. Each relay device 32 is connected to a predetermined number of sub-modules 7 via a star-type network 43. Each relay device 32 is star-connected to a plurality of sub-modules 7 forming a single arm, for example. In this way, the ring-type network topology and the star-type network topology are combined to establish a network between control device 30 and each of sub-modules 7.

For each period Ts1 during an operation control period, relay apparatus 70 transmits, to each sub-module 7, control command 15 generated by control device 30. For each period shorter than period Ts1, relay apparatus 70 may transmit control command 15 to each sub-module 7. Moreover, relay apparatus 70 is configured to generate, for each sub-module of a plurality of sub-modules 7, path information indicating a communication path from control device 30 to this sub-module 7, and output the generated path information to this sub-module 7, during an initial setting period in which setting necessary for causing each sub-module 7 to operate is made.

Relay apparatus 70 is typically configured in the form of a dedicated circuit, and a part or the whole of relay apparatus 70 may be configured in the form of an FPGA (Field Programmable Gate Array). More details of an example configuration of relay apparatus 70 are given later herein.

Using the path information generated by relay apparatus 70, each sub-module 7 of a plurality of sub-modules 7 generates identification information uniquely identifying this sub-module 7. Based on the identification information and the number of sub-modules, each sub-module 7 generates a carrier phase. In accordance with control command 15 and the carrier phase, each sub-module 7 performs PWM (pulse width modulation) control on each switching device. More details of an example configuration of sub-module 7 are given later herein.

[Example Configuration of Control Device]

Figure 3:
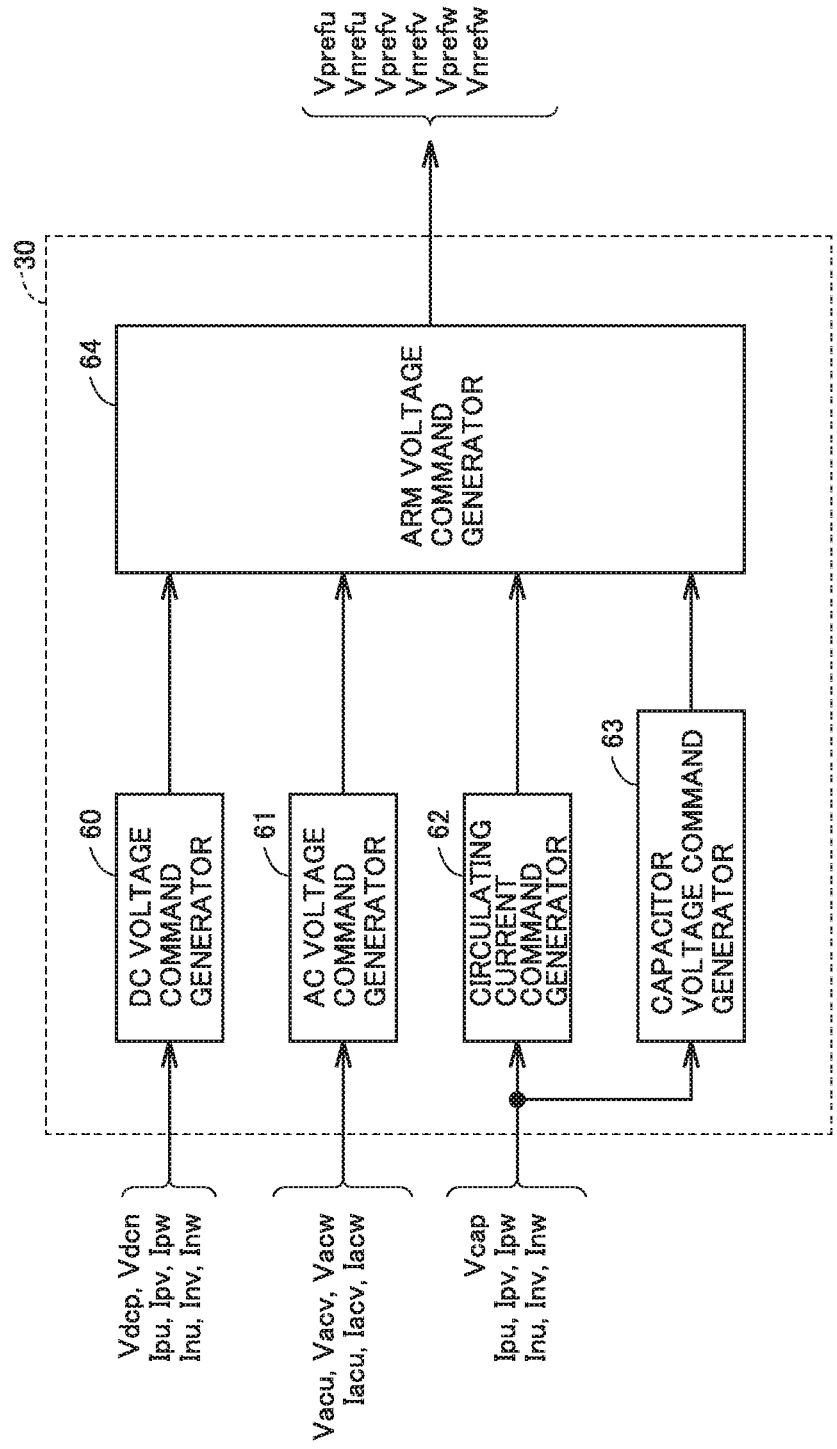
FIG. 3 is a block diagram showing an example configuration of a control device.

FIG. 3 is a block diagram showing an example configuration of control device 30. Referring to FIG. 3, control device 30 includes a DC voltage command generator 60, an AC voltage command generator 61, a circulating current command generator 62, a capacitor voltage command generator 63, and an arm voltage command generator 64.

DC voltage command generator 60 calculates DC current value Idc based on upper arm currents IPDU, Ivy, Ipw and lower arm currents Innu, In, Inw of respective phases. Specifically, DC current value Idc can be calculated by the following expression (1), where Idc_p is the sum of upper arm currents IPDU, Ivy, Ipw, and Idc_n is the sum of lower arm currents Innu, In, Inw.

$$Idc = (Idc\_p + Idc\_n)/2 \quad (1)$$

DC voltage command generator 60 generates the DC voltage command value based on DC voltage values DC, DC detected by DC voltage detectors 11A, 11B, and calculated DC current value Idc. DC voltage command generator 60 is configured in the form of a feedback controller such as PID controller (Proportional-Integral-Differential controller), for example.

AC voltage command generator 61 generates an AC voltage command value for each phase, based on U phase, V phase, and W phase AC voltage values Vacu, Vacv, and Vacw detected by AC voltage detector 10, and U phase, V phase, and W phase AC current values Iacu, Iacy, and IMacs detected by AC current detector 16. AC voltage command generator 61 is configured in the form of a feedback controller such as PID controller, for example.

Circulating current command generator 62 first calculates circulating currents Iccu, Iccv, Iccw flowing in respective leg circuits 4u, 4v, 4w, based on upper arm currents IPDU, Ivy, Ipw and lower arm currents Innu, In, Inw of respective phases. The circulating current is current circulating through a plurality of leg circuits 4. For example, circulating current Iccu flowing in U phase leg circuit 4u can be calculated by the following expression (2).

$$Iccu=(Ipu+Inu)/2-Idc/3 \qquad (2)$$

The first term in the above expression (2) represents current flowing commonly in upper arm 5 and lower arm 6 of leg circuit 4u. The second term in the above expression (2) represents a corresponding portion of DC current flowing in U phase leg circuit 4u, supposing that DC current value Idc flows equally in each of the leg circuits. Circulating currents Iccv, Iccw can be calculated similarly to circulating current Iccu.

Circulating current command generator 62 calculates a command value for the circulating current of each phase, based on calculated circulating currents Iccu, Iccv, Iccw for respective phases and cell capacitor voltage Vcap which is an average for each arm circuit. Circulating current command generator 62 is configured in the form of a feedback controller such as PID controller, for example.

Capacitor voltage command generator 63 generates a voltage command value for the DC capacitor of each sub-module 7, based on cell capacitor voltage Vcap which is an average for each arm circuit, and upper arm currents IPDU, Ivy, Ipw and lower arm currents Innu, In, Inw of respective phases. Capacitor voltage command generator 63 is configured in the form of a feedback controller such as PID controller, for example.

Arm voltage command generator 64 generates arm voltage command values Vprefu, Vnrefu, Vprefv, Vnrefv, Vprefw, Pnrefw for upper arm 5 and lower arm 6 of each phase by combining the above-described command generators. Arm voltage command values Vprefu, Vnrefu, Vprefv, Vnrefv, Vprefw, Pnrefw for respective phases are transmitted as voltage commands to relay apparatus 70. In the following description, arm voltage command values may be referred to simply as arm voltage command values Vpref, Vnref where a particular phase is not specified.

The above-described configuration of control device 30 is given as an example, and a control device having a different configuration is also applicable to the present embodiment.

[Configuration and Operation of Relay Apparatus]

Figure 4:
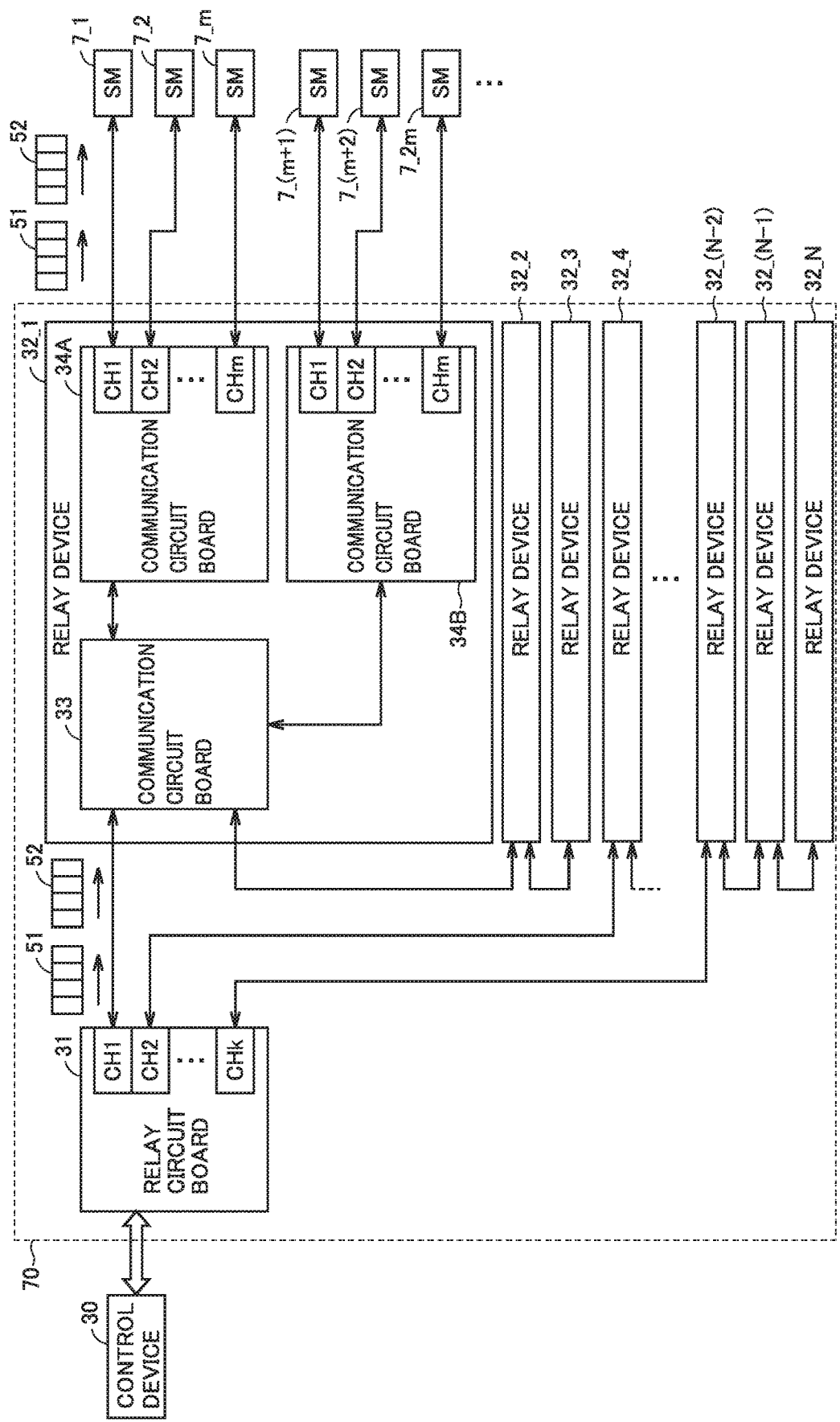
FIG. 4 is a diagram for illustrating a specific configuration and a specific operation of a relay apparatus.

FIG. 4 is a diagram for illustrating a specific configuration and a specific operation of relay apparatus 70. While FIG. 4 exemplarily shows only sub-modules 7 included in U phase leg circuit 4u, sub-modules 7 in other leg circuits 4v, 4w are similar to the shown sub-modules.

Referring to FIG. 4, relay circuit board 31 is configured in the form of a dedicated circuit such as LSI (Large-Scale Integration), and includes a plurality of channels CH1 to CHk for communication. Relay circuit board 31 is connected to relay devices 32 via a ring-type network, and transmits, to each relay device 32, the control command generated by control device 30 for example, using a plurality of channels CH1 to CHk.

In the example in FIG. 4, relay circuit board 31 communicates with a plurality of relay devices 32_1 to 32_3 via channel CH1. Relay circuit board 31 also communicates with a plurality of relay devices 32 including relay device 32_4 via channel CH2, and communicates with a plurality of relay devices 32_(N–2) to 32_N via channel CHk. While the present embodiment is described in connection with a configuration in which three relay devices 32 are connected to each channel, the configuration is not limited to the illustrated one. For example, the configuration may be the one in which one, two, or four or more relay devices 32 are connected to each channel, for example.

Relay device 32_1 includes a communication circuit board 33 and communication circuit boards 34A, 34B (hereinafter also referred to collectively as "communication circuit board 34"). Communication circuit boards 33, 34A, 34B are each configured in the form of a dedicated circuit such as LSI. Communication circuit board 33 is connected to be capable of communicating with communication circuit board 34A and communication circuit board 34B. Communication circuit boards 34A, 34B include a plurality of channels CH1 to CHm. While the present embodiment is described in connection with a configuration in which relay device 32 includes two communication circuit boards 34, the configuration is not limited to the illustrated one. For example, the configuration may be the one in which relay device 32 includes a single communication circuit board 34, or three or more communication circuit boards 34.

Communication circuit board 34A is configured to be capable of communicating with a predetermined number of sub-modules 7_1 to 7_m via a star-type network. More specifically, communication circuit board 34A communicates with sub-module 7_1 via channel CH1, communicates with sub-module 7_2 via channel CH2, and communicates with sub-module 7_m via channel CHm. Likewise, communication circuit board 34B communicates with sub-modules 7_(m+1) to 7_2m via a star-type network.

Relay apparatus 70 transmits, to each sub-module 7, a communication frame 51 for initial setting, during an initial setting period prior to an operation control period in which normal operation control is performed on each sub-module 7. Relay apparatus 70 also transmits, to each sub-module 7, a communication frame 52 for control, during the operation control period. The initial setting period is a period for making initial setting necessary for driving each sub-module 7.

Figure 5:
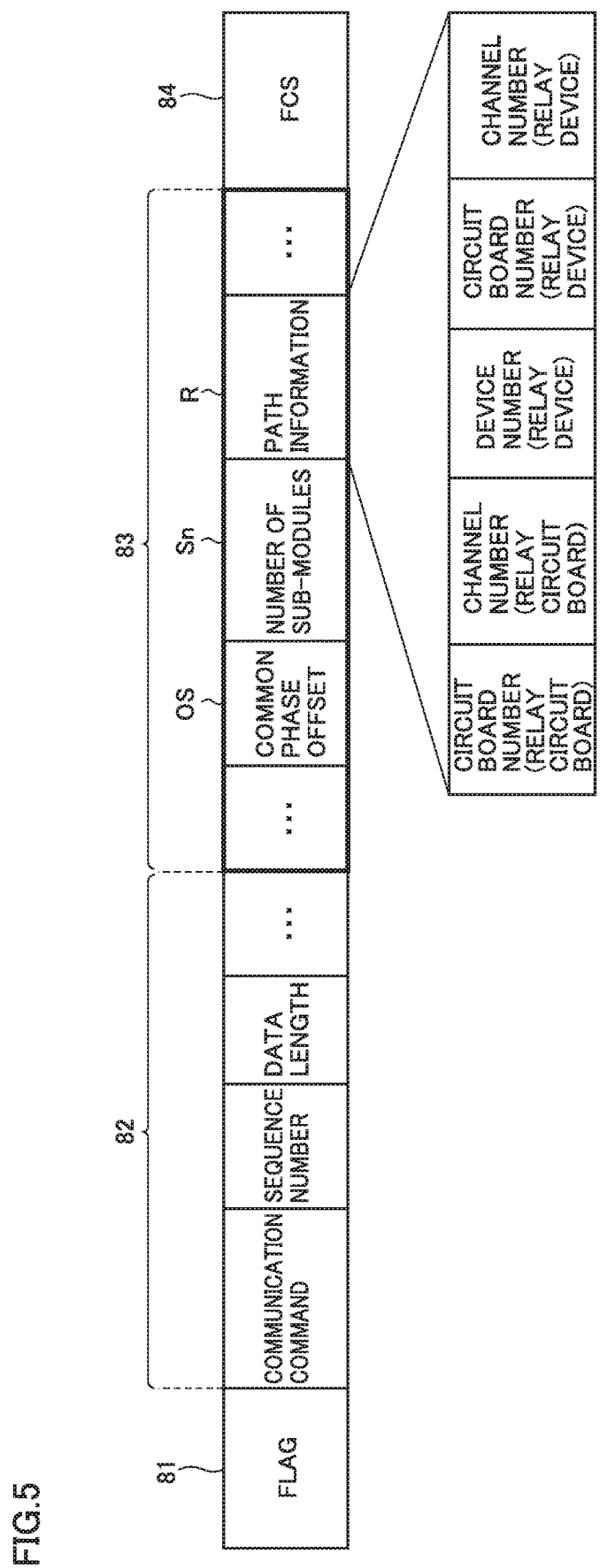
FIG. 5 is a diagram showing a configuration of a communication frame for initial setting.

FIG. 5 is a diagram showing a configuration of communication frame 51 for initial setting. Referring to FIG. 5, communication frame 51 includes a flag region 81, a header region 82, a payload region 83 in which the body of data is stored, and an FCS (Frame Check Sequence) region 84 in which error detection information is stored. In header region 82, information such as communication command, sequence number, and data length is stored. Payload region 83 includes a common phase offset OS, the number of sub-modules Sn, and path information R. Path information R includes the circuit board number that is information identifying relay circuit board 31, a channel number that is information identifying a channel of relay circuit board 31, a device number that is information identifying relay device 32, a circuit board number that is information identifying communication circuit board 34 included in relay device 32, and a channel number that is information identifying a channel of communication circuit board 34.

Path information R is information indicating a communication path from control device 30 to each sub-module 7, and generated by relay apparatus 70. In the example in FIG. 4, sub-module 7_1 receives communication frame 51 via channel CH1 of relay circuit board 31 and channel CH1 of communication circuit board 34A included in relay device 32_1. In this case, relay circuit board 31 stores the circuit board number ("1" for example) of relay circuit board 31 and the number ("1" for example) of channel CH1, in the field of the path information in communication frame 51. Then, relay device 32_1 (communication circuit board 33 for example) stores the device number ("1" for example) of relay device 32_1, in the field of the path information in communication frame 51. Moreover, communication circuit board 34A stores the circuit board number ("1" for example) of communication circuit board 34A and the number ("1" for example) of channel CH1.

Accordingly, sub-module 7_1 receives communication frame 51 including the path information "111111." Sub-module 7_2 also receives path information "111112" for example, because sub-module 7_2 receives communication frame 51 via channel CH1 of relay circuit board 31 and channel CH2 of communication circuit board 34A included in relay device 32_1. Thus, each sub-module 7 receives unique path information generated by relay apparatus 70. Each sub-module 7 can therefore generate unique identification information based on such path information.

The number of sub-modules Sn is typically the number of sub-modules 7 to be controlled among a plurality of sub-modules 7 forming each arm (upper arm 5, lower arm 6, or the like, for example). Typically, the number of sub-modules Sn is the number of all sub-modules 7 forming each arm. It should be noted that if the number of sub-modules 7 forming each arm involves redundancy, the number of sub-modules Sn may be the number of sub-modules 7 to be controlled actually.

Common phase offset OS is a phase that is offset commonly to all sub-modules 7 forming each arm. Common phase offset OS is determined arbitrarily by a system operator. If common phase offset OS is unnecessary, communication frame 51 may not include common phase offset OS.

Figure 6:
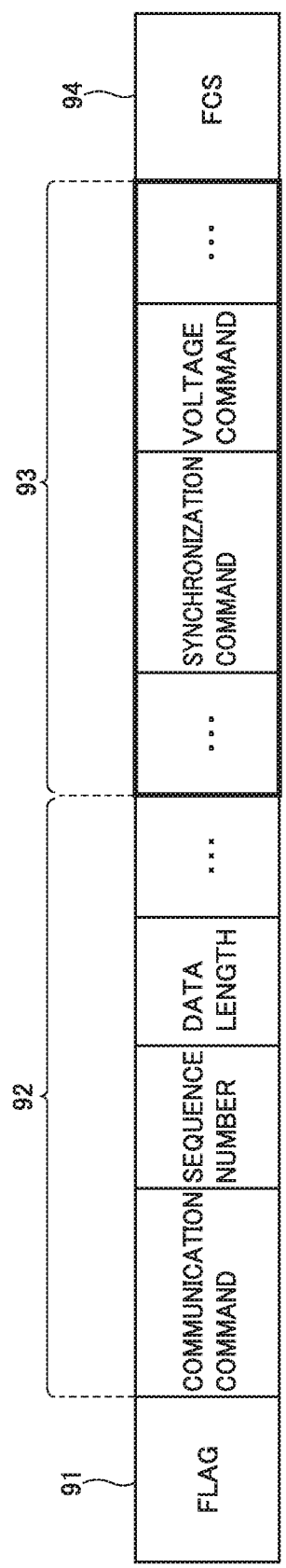
FIG. 6 is a diagram showing a configuration of a communication frame for control.

FIG. 6 is a diagram showing a configuration of communication frame 52 for control. Referring to FIG. 6, communication frame 52 includes a flag region 91, a header region 92, a payload region 93 in which the body of data is stored, and an FCS region 94 in which error detection information is stored. In header region 92, information such as communication command, sequence number, and data length is stored. Payload region 93 includes a synchronization command (synchronization pulse signal, for example) and a voltage command (an output voltage command value for upper arm 5 and an output voltage command value for lower arm 6 in each of leg circuits 4u, 4v, 4w, for example).

[Example Configuration of Sub-Module]

Figure 7:
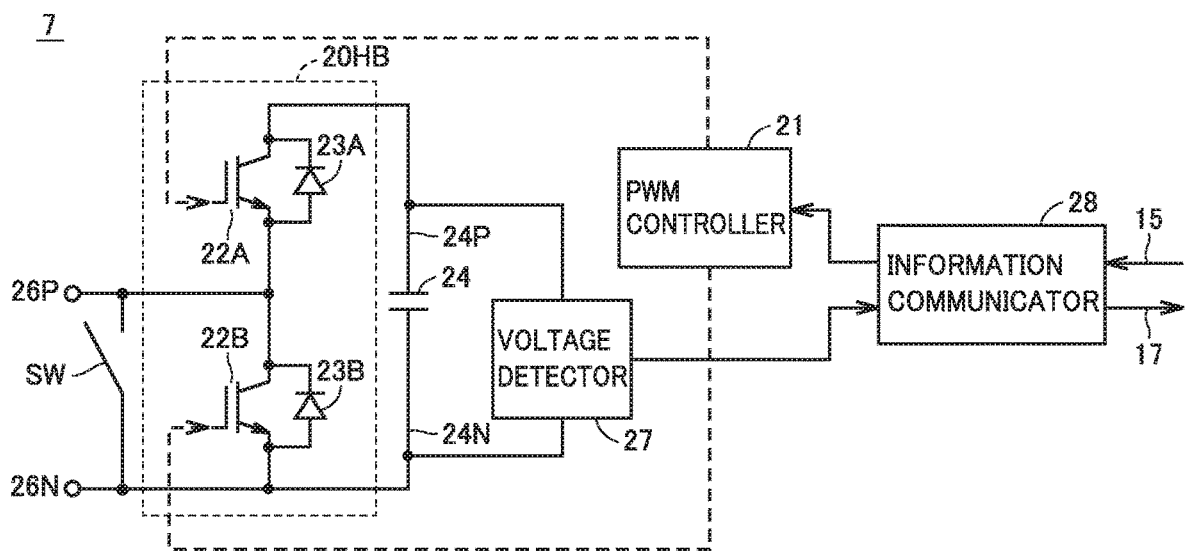
FIG. 7 is a circuit diagram showing an example of a sub-module which is a component of each leg circuit in FIG. 1.

Overall Configuration FIG. 7 is a circuit diagram showing an example of the sub-module which is a component of each leg circuit in FIG. 1. Sub-module 7 shown in FIG. 7 includes a half-bridge-type conversion circuit 20HB, a PWM controller 21, a DC capacitor 24 serving as an energy storage, a voltage detector 27, and an information communicator 28. A series of operations of PWM controller 21, voltage detector 27, and information communicator 28 are performed for each period Ts2 (several μs, for example) considerably shorter than period Ts1 that is an operation period of control device 30.

Half-bridge-type conversion circuit 20HB includes switching devices 22A, 22B connected in series to each other, and diodes 23A, 23B. Diodes 23A, 23B are connected in anti-parallel (i.e., in parallel in the reverse-bias direction) with switching devices 22A, 22B, respectively. DC capacitor 24 is connected in parallel with the series-connected circuit made up of switching devices 22A, 22B for holding a DC voltage. A connection node between switching devices 22A and 22B is connected to a high-potential-side input/output terminal 26P. A connection node between switching devices 22B and DC capacitor 24 is connected to a low-potential-side input/output terminal 26N.

Typically, input/output terminal 26P is connected to input/output terminal 26N of sub-module 7 adjacent on the positive side to the illustrated sub-module 7. Input/output terminal 26N is connected to input/output terminal 26P of sub-module 7 adjacent on the negative side to the illustrated sub-module 7.

As each of switching devices 22A, 22B, a self-arc-extinguishing-type switching device is used, of which ON operation and OFF operation can both be controlled. Switching devices 22A, 22B are each an IGBT (Insulated Gate Bipolar Transistor) or GCT (Gate Commutated Turn-off thyristor), for example.

A bypass switch SW is connected between input/output terminals 26P and 26N. Bypass switch SW is a switch configured to be capable of short-circuiting the opposite terminals of switching device 22B by closing the contact, and allowing fault current to flow. Specifically, bypass switch SW short-circuits sub-module 7 to thereby protect each of the devices (switching devices 22A, 22B, diodes 23A, 23B, and DC capacitor 24) included in sub-module 7, from overcurrent generated in the event of a fault.

Bypass switch SW is also used for short-circuiting sub-module 7 when each device in this sub-module 7 has failed. Accordingly, even when any sub-module 7 of a plurality of sub-modules 7 has failed, another sub-module 7 can be used to keep power conversion apparatus 1 operating.

Voltage detector 27 detects the voltage between opposite terminals 24P and 24N of DC capacitor 24 (i.e., capacitor voltage). Information communicator 28 transmits, to PWM controller 21, communication frames 51, 52 received from relay device 32, and transmits, to command generator 3, a signal 17 including abnormality determination information about sub-module 7 and the capacitor voltage detected by voltage detector 27.

PWM controller 21 performs PWM control on each of switching devices 22A, 22B, using the path information included in communication frame 51 received from information communicator 28 and the control command (i.e., the voltage command and the synchronization command) included in communication frame 52 received therefrom. A specific configuration of PWM controller 21 is described later herein.

Typically, during a normal operation (i.e., zero voltage or positive voltage is output between input/output terminals 26P and 26N), PWM controller 21 performs control to cause one of switching devices 22A, 22B to be in the ON state and the other to be in the OFF state. While switching device 22A is in the ON state and switching device 22B is in the OFF state, a voltage across DC capacitor 24 is applied between input/output terminals 26P and 26N. On the contrary, while switching device 22A is in the OFF state and switching device 22B is in the ON state, the voltage between input/output terminals 26P and 26N is 0 V.

Sub-module 7 can cause switching devices 22A, 22B to become the ON state alternately to thereby output zero voltage or a positive voltage depending on the voltage of DC capacitor 24. Diodes 23A, 23B are provided for the sake of protection when a reverse-direction voltage is applied to switching devices 22A, 22B.

Above-described PWM controller 21, voltage detector 27, and information communicator 28 may be configured in the form of a dedicated circuit, or configured using an FPGA or the like.

In the foregoing, the conversion circuit of sub-module 7 is described as a half-bridge-type conversion circuit. The configuration, however, is not limited to this. For example, sub-module 7 may be configured using a full-bridge-type conversion circuit, or a three-quarter-bridge-type conversion circuit.

Configuration of PWM Controller

Figure 8:
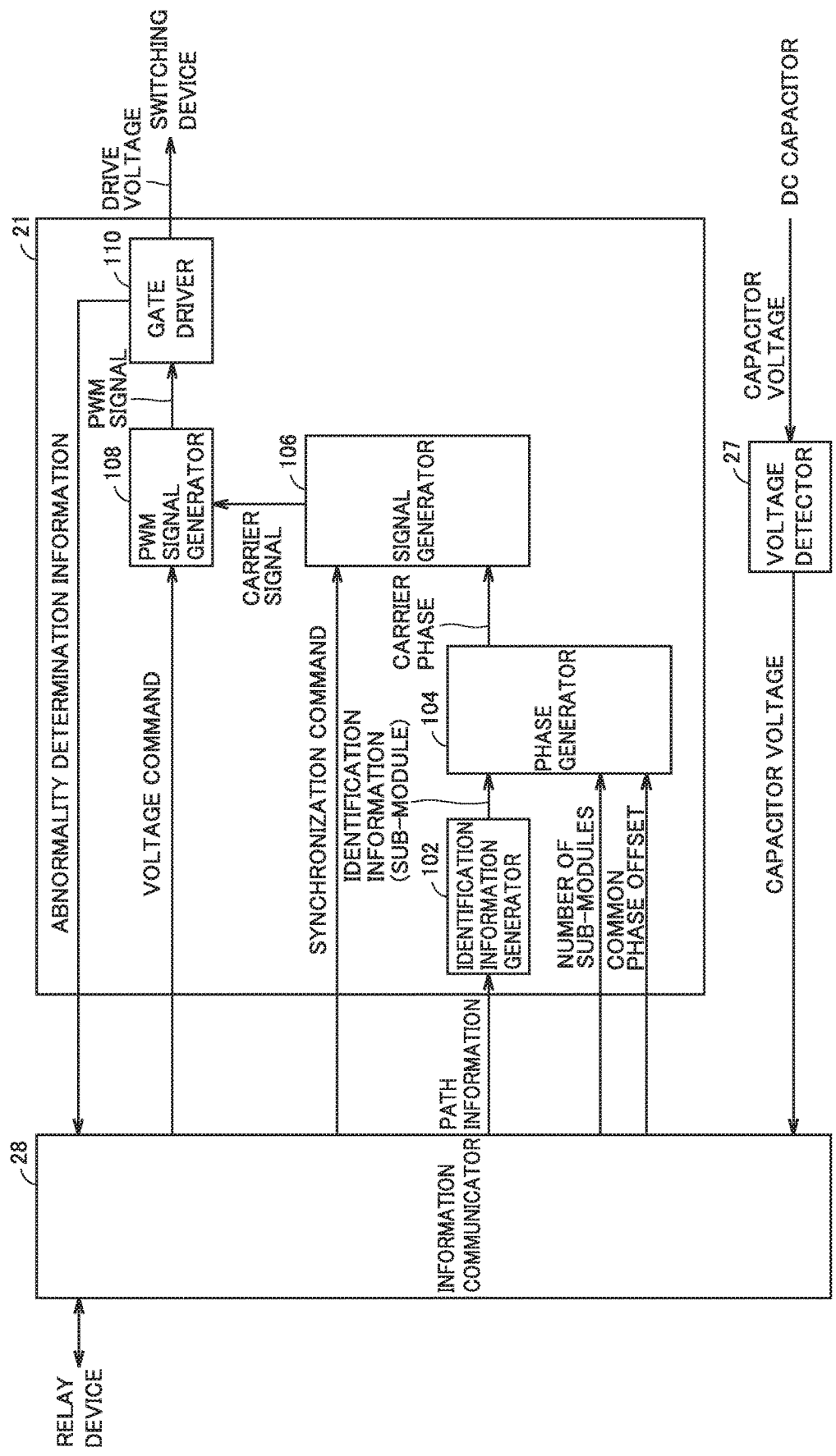
FIG. 8 is a block diagram for illustrating a specific configuration of a PWM controller.

FIG. 8 is a block diagram for illustrating a specific configuration of the PWM controller. PWM controller 21 includes an identification information generator 102, a phase generator 104, a signal generator 106, a PWM signal generator 108, and a gate driver 110.

Referring to FIG. 8, identification information generator 102 generates identification information of sub-module 7, based on the path information included in communication frame 51. Identification information generator 102 uses a predetermined formula to convert the path information "111111" to identification information "1" and convert the path information "111112" to identification information "2" for example. As described above, the path information is determined uniquely for each sub-module 7. Therefore, the identification information generated in sub-module 7 is determined uniquely, without overlapping identification information generated in other sub-modules 7.

Phase generator 104 generates a carrier phase based on the identification information generated by identification information generator 102, and the number of sub-modules Sn and common phase offset OS that are included in communication frame 51.

Specifically, phase generator 104 uses the number of sub-modules Sn to calculate a carrier interval D (=360°/(carrier signal multiplication factor×number of sub-modules Sn)). Here, the carrier signal multiplication factor represents how many times the carrier signal frequency is higher than the AC system frequency, and is 1.0 or more. Based on common phase offset OS and carrier interval D corresponding to the identification information, phase generator 104 generates the carrier phase. The carrier phase is a phase shifted by "common phase offset OS+carrier interval D corresponding to the identification information" with respect to a reference phase, and determined uniquely for each sub-module 7. Phase generator 104 stores the generated carrier phase in an internal memory of sub-module 7.

Signal generator 106 generates a carrier signal based on the carrier phase generated by phase generator 104 and the synchronization command (i.e., the synchronization pulse signal corresponding to the reference phase) included in communication frame 52.

Figure 9:
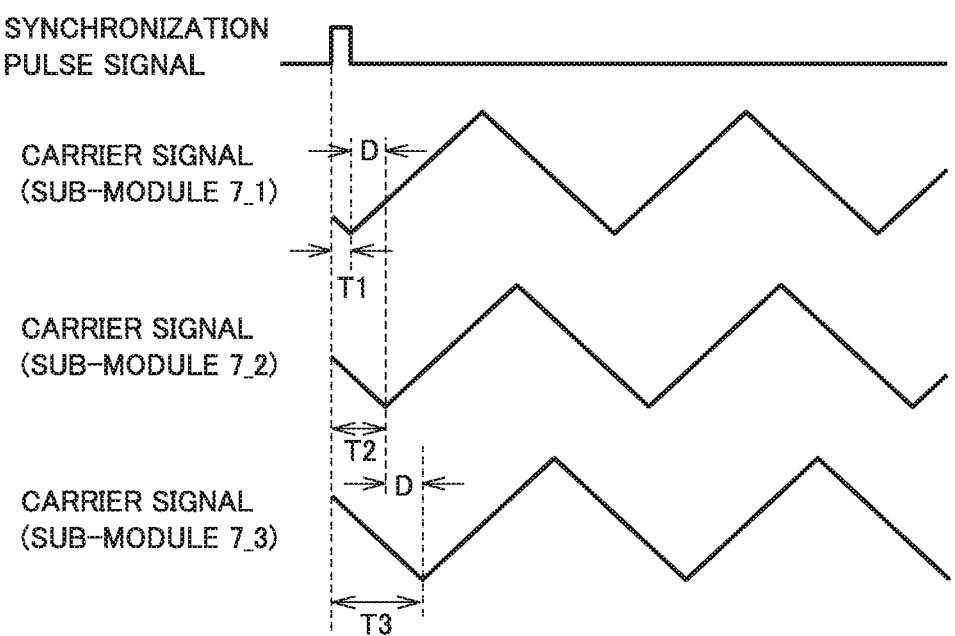
FIG. 9 is a diagram showing an example of a carrier signal for each sub-module.

FIG. 9 is a diagram showing an example of the carrier signal of each sub-module 7. In the example in FIG. 9, it is supposed that sub-module 7_1 has identification information "1," sub-module 7_2 has identification information "2" and sub-module 7_3 has identification information "3" for the sake of simplification of the description. Using carrier interval D and common phase offset OS, carrier phase T is represented by the following expression (3) where "M" is the number indicated by the identification information.

$$\text{Carrier phase } T=(M-1)\times\text{carrier interval } D+\text{common phase offset } OS \quad (3)$$

Referring to FIG. 9, the carrier signal generated in sub-module 7_1 is a triangular wave signal shifted by carrier phase T1 with respect to the synchronization pulse signal (i.e., reference phase). Based on the expression (3), carrier phase T1 corresponds to "common phase offset OS."

The carrier signal generated in sub-module 7_2 is a triangular wave signal shifted by carrier phase T2 with respect to the synchronization pulse signal. Based on the expression (3), carrier phase T2 corresponds to "carrier interval D+common phase offset OS."

The carrier signal generated in sub-module 7_3 is a triangular wave signal shifted by carrier phase T3 with respect to the synchronization pulse signal. Based on the expression (3), carrier phase T3 corresponds to "2×carrier interval D+common phase offset OS."

Thus, signal generator 106 is capable of generating a different carrier signal for each sub-module 7.

Referring again to FIG. 8, PWM signal generator 108 compares the voltage command included in communication frame 52 with the carrier signal generated by signal generator 106 to generate a PWM signal in the pulse waveform. PWM signal generator 108 outputs the generated PWM signal to gate driver 110.

Gate driver 110 outputs, to an electrical conduction control terminal (gate terminal, for example) of switching devices 22A, 22B, a drive voltage based on the PWM signal generated by PWM signal generator 108. In another aspect, gate driver 110 outputs, to information communicator 28, abnormality determination information indicating whether gate driver 110 has abnormality or not.

Information communicator 28 transmits, to control device 30 via relay device 32, the abnormality determination information of gate driver 110 as abnormality information of sub-module 7, for example. The abnormality determination information is not limited to the information indicating whether gate driver 110 has abnormality or not, but may be information indicating whether each device of sub-module 7 has abnormality or not. Information communicator 28 transmits, to relay device 32, the capacitor voltage detected by voltage detector 27. Control device 30 receives the abnormality determination information and the capacitor voltage via relay circuit board 31.

This abnormality determination information is used for recognizing the number of sub-modules 7 to be controlled by control device 30. Specifically, based on abnormality determination information received from sub-modules 7 during the initial setting period, control device 30 calculates the number of normal sub-modules among these sub-modules 7. It is supposed that control device 30 determines that L sub-modules 7 have abnormality among X sub-modules 7 forming upper arm 5, for example. In this case, control device 30 may set the number of sub-modules Sn included in communication frame 51 to (X−L) that is the number of normal sub-modules. In this way, PWM controller 21 can appropriately generate the carrier signal of each sub-module 7 to be controlled.

[Process Procedure]

Figure 10:
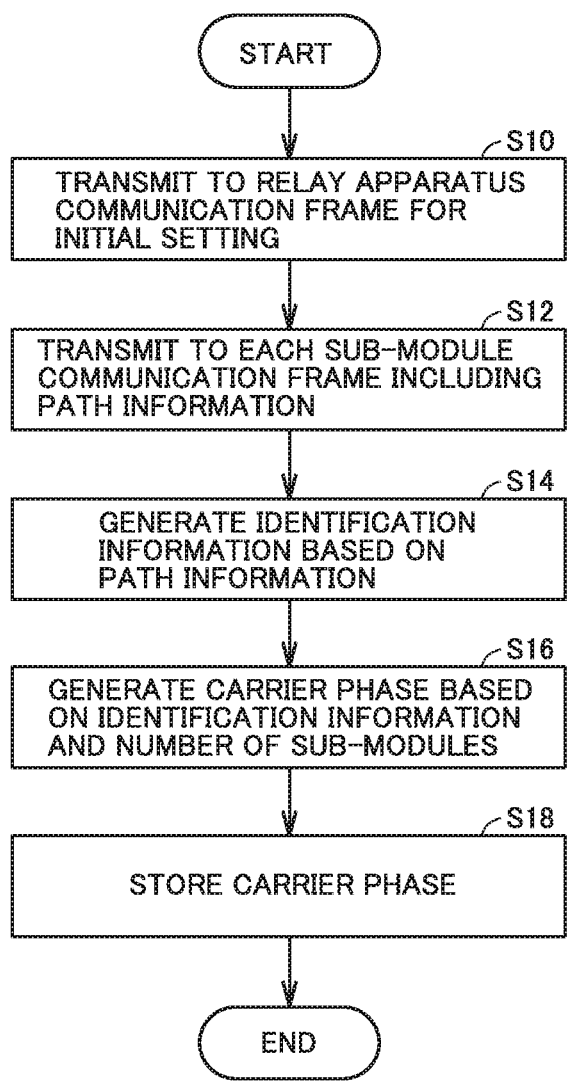
FIG. 10 is a flowchart showing a process procedure during an initial setting period of the power conversion apparatus.

FIG. 10 is a flowchart showing a process procedure during an initial setting period of power conversion apparatus 1. The process shown in FIG. 10 is performed repeatedly during the initial setting period.

Referring to FIG. 10, control device 30 transmits, to relay apparatus 70, communication frame 51 for initial setting (step S10). Relay apparatus 70 generates path information R of the path from control device 30 to each sub-module 7, and transmits, to sub-module 7, communication frame 51 including the generated path information R (step S12).

Based on the path information included in communication frame 51 received from relay apparatus 70, each sub-module 7 generates identification information of sub-module 7 (step S14). Each sub-module 7 generates a carrier phase based on the identification information and the number of sub-modules (step S16). Each sub-module 7 stores the carrier phase in an internal memory (step S18).

It should be noted that each sub-module 7 transmits abnormality determination information to control device 30 via relay apparatus 70 at predetermined intervals. Control device 30 may calculate the number of normal sub-modules among sub-modules 7 based on the abnormality determination information, and transmit communication frame 51 including the number of normal sub-modules as number of sub-modules Sn.

Figure 11:
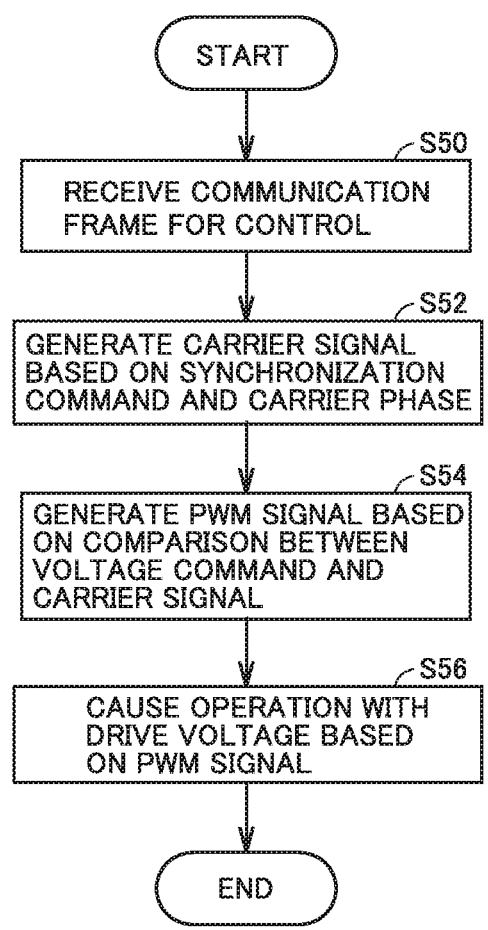
FIG. 11 is a flowchart showing a process procedure during an operation control period of the power conversion apparatus.

FIG. 11 is a flowchart showing a process procedure during an operation control period of power conversion apparatus 1. The process shown in FIG. 11 is performed repeatedly during the operation control period. The initial setting period is switched to the operation control period typically in accordance with an instruction from a system operator. Alternatively, when a predetermined time has elapsed since the start of the initial setting period, the initial setting period may be switched automatically to the operation control period.

Referring to FIG. 11, control device 30 transmits communication frame 52 for control to each sub-module 7 via relay apparatus 70 (step S50). Each sub-module 7 generates a carrier signal based on the synchronization command included in communication frame 52 received from control device 30 and the carrier phase stored in the internal memory (step S52).

Each sub-module 7 compares the voltage command with the carrier signal to generate a PWM signal (step S54). Each sub-module 7 causes switching devices 22A, 22B to operate with the drive voltage based on the PWM signal (step S56).

[Advantages]

According to the present embodiment, each sub-module 7 can autonomously generate the identification information using path information R about the path from control device 30 to sub-module 7. It is therefore possible to save the workload of the system operator required for setting the identification information of each sub-module 7 and prevent human errors such as erroneous setting.

According to the present embodiment, a field in which path information R is to be stored is included in communication frame 51 transmitted from control device 30 to each sub-module 7 via relay apparatus 70. Accordingly, while communication frame 51 is passed through relay apparatus 70, path information R is generated automatically.

According to the present embodiment, each sub-module 7 can generate the carrier signal using the carrier phase generated through use of the identification information and using the synchronization command included in communication frame 52 for control. Thus, each sub-module 7 can receive communication frame 52 to adjust the phase simultaneously. Accordingly, it is unnecessary to individually give the phase information of the carrier signal from control device 30 to each sub-module 7, and therefore, the amount of communicated data and the frequency of the communication can be reduced.

According to the present embodiment, the communication frame for initial setting and the communication frame for control are transmitted separately from each other, and it is therefore possible to reduce the size of each communication frame (i.e., shorten the communication frame length). Accordingly, the time required for transmitting each communication frame can be shortened and a delay in transmission between control device 30 and each sub-module 7 can be reduced. In particular, it is only the voltage command and the synchronization command that should be transmitted during the operation control period, and it is therefore possible to considerably reduce the data size. Thus, it is possible to reduce the time required for communication during the operation control period and shorten the control period.

Other Embodiments (1) According to the embodiment described above, power conversion apparatus 1 includes a plurality of relay devices 32. The embodiment, however, is not limited to this configuration. For example, power conversion apparatus 1 may include a single relay device 32. In this case, relay circuit board 31 is connected to relay device 32 through a point-to-point type network.

(2) According to the embodiment described above, the number of sub-modules Sn and common phase offset OS are included in communication frame 51 and transmitted. The embodiment, however, is not limited to this. For example, if the number of sub-modules Sn and common phase offset OS are stored in advance in an internal memory of each sub-module 7, communication frame 51 may have a configuration that does not include the number of sub-modules Sn and common phase offset OS.

(3) According to the embodiment described above, path information R includes the circuit board number of relay circuit board 31, the channel number of relay circuit board 31, the device number of relay device 32, the circuit board number of communication circuit board 34 included in relay device 32, and the channel number of communication circuit board 34. The embodiment, however, is not limited to this, and it may at least be required to use some of these numbers to generate unique path information R for each sub-module 7. For example, path information R may be generated using the device number of relay device 32, the circuit board number of communication circuit board 34, and the channel number of communication circuit board 34, without using the information about relay circuit board 31.

(4) According to the embodiment described above, control device 30 transmits communication frame 51 for initial setting. The embodiment, however, is not limited to this. For example, an external device separate from control device 30 may be connected to relay circuit board 31 and, based on a signal that is input from the external device, relay circuit board 31 may transmit communication frame 51 to each sub-module 7.

(5) According to the embodiment described above, communication frame 51 for initial setting and communication frame 52 for control are provided separately from each other. The embodiment, however, is not limited to this, and a common communication frame may be provided instead. In this case, in the payload region of the common communication frame, common phase offset OS, the number of sub-modules Sn, path information R, the synchronization command, and the voltage command, for example, are stored.

(6) According to the embodiment described above, relay device 32 and sub-modules 7 are connected via a star-type network. The embodiment, however, is not limited to this. For example, communication circuit board 34 of relay device 32 may be connected to a plurality of sub-modules 7 via a ring-type network.

It is supposed here that J sub-modules 7 are connected, via a ring-type network, to each channel of communication circuit board 34A in relay device 32_1. In this case, the 1st to J-th sub-modules 7 connected to channel CH1 of communication circuit board 34A receive the same path information R1. Likewise, the (J+1)-th to 2J-th sub-modules 7 connected to channel CH2 receive the same path information R2. Thus, the identification information of each sub-module 7 is generated in the following way.

The first sub-module 7 that first receives communication frame 51 via channel CH1 of communication circuit board 34A generates identification information "1" based on path information R1. The first sub-module 7 stores the identification information "1" in a predetermined field of communication frame 51 and transmits this communication frame 51 to the second sub-module 7. Based on path information R1, the second sub-module 7 generates identification information "2" different from the identification information "1" added to communication frame 51. The second sub-module 7 stores the identification information "2" in a predetermined field of communication frame 51, and transmits this communication frame 51 to the third sub-module 7. In this way, identification information generator 102 corresponding to the J-th sub-module 7 generates identification information "J" that is different from the identification information of other sub-modules 7, based on the path information.

The (J+1)-th sub-module 7 that first receives communication frame 51 via channel CH2 of communication circuit board 34A generates identification information "J+1" based on path information R2. Likewise, the subsequent (J+2)-th to 2J-th sub-modules 7 generate identification information "J+2" to "2J" respectively, based on path information R2. The number of sub-modules connected to each channel may be the same or different depending on the channel.

For other channels of communication circuit board 34A, other communication circuit boards 34B, and other relay devices 32, the identification information is generated similarly. Even when a plurality of sub-modules 7 receive the same path information from relay device 32 via a ring-type network, these sub-modules 7 are each capable of autonomously generating unique identification information using the path information.

(7) The configuration illustrated above by way of example in connection with the above-described embodiment is an example configuration of the present invention, and can be combined with another known technique, or the configuration can be modified by being omitted partially, for example, without going beyond the scope of the present invention.

Moreover, the embodiment described above may be implemented by appropriately introducing, into the embodiment, a process(es) and/or a configuration(s) described above in connection with other embodiments.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 power conversion apparatus; 2 power conversion circuitry; 3 command generator; 4u, 4v, 4w leg circuit; 5 upper arm; 6 lower arm; 7 sub-module; 8A, 8B reactor; 9A, 9B arm current detector; 10 AC voltage detector; 11A, 11B DC voltage detector; 12 AC circuit; 13 interconnection transformer; 14 DC circuit; 15 control command; 16 AC current detector; 17 signal; 20HB conversion circuit; 21 PWM controller; 22A, 22B switching device; 23A, 23B diode; 24 DC capacitor; 27 voltage detector; 28 information communicator; 30 control device; 31 relay circuit board; 32 relay device; 33, 34 communication circuit board; 41 bus; 42, 43 network; 51, 52 communication frame; 60 DC voltage command generator; 61 AC voltage command generator; 62 circulating current command generator; 63 capacitor voltage command generator; 64 arm voltage command generator; 70 relay apparatus; 102 identification information generator; 104 phase generator; 106 signal generator; 108 PWM signal generator; 110 gate driver

The invention claimed is:

1. A power conversion apparatus performing power conversion between a DC circuit and an AC circuit, the power conversion apparatus comprising:
   power conversion circuitry including a plurality of sub-modules connected in series to each other;
   a control device to generate a control command for controlling operation of the plurality of sub-modules; and
   a relay apparatus to relay communication between the control device and the plurality of sub-modules, wherein
   for each sub-module of the plurality of sub-modules, the relay apparatus generates path information indicating a communication path from the control device to the sub-module, and outputs the generated path information to the sub-module, and
   each sub-module of the plurality of sub-modules includes
      an identification information generator to generate identification information of the sub-module based on the path information corresponding to the sub-module,
      a phase generator to generate a carrier phase based on the identification information and a number of sub-modules to be controlled among the plurality of sub-modules; and
      a PWM controller to perform PWM control on a switching device in accordance with the control command and the carrier phase.

2. The power conversion apparatus according to claim 1, wherein
   the relay apparatus includes:
      a relay circuit board connected to the control device; and
      at least one relay device connected to the relay circuit board,
   the at least one relay device includes a communication circuit board for communicating with a predetermined number of sub-modules among the plurality of sub-modules, and
   the path information includes first information for identifying the at least one relay device and second information for identifying the communication circuit board.

3. The power conversion apparatus according to claim 2, wherein
   the communication circuit board is connected to the predetermined number of sub-modules via a star-type network, and
   the path information further includes third information for identifying a channel of the communication circuit board connected to each of the predetermined number of sub-modules.

4. The power conversion apparatus according to claim 3, wherein the path information further includes fourth information for identifying the relay circuit board.

5. The power conversion apparatus according to claim 4, wherein the at least one relay device comprises a plurality of relay devices, and the relay circuit board is connected to the plurality of relay devices via a ring-type network.

6. The power conversion apparatus according to claim 4, wherein
   the power conversion circuitry includes:
      a high-potential-side DC terminal and a low-potential-side DC terminal that are connected to the DC circuit; and
      a plurality of leg circuits corresponding to respective phases of the AC circuit and connected in parallel with each other between the high-potential-side DC terminal and the low-potential-side DC terminal,
the plurality of leg circuits each include:
a connecting part connected electrically to a corresponding phase of the AC circuit;
an upper arm including multiple sub-modules among the plurality of sub-modules, the multiple sub-modules being connected in series to each other between the connecting part and the high-potential-side DC terminal; and
a lower arm including multiple sub-modules among the plurality of sub-modules, the multiple sub-modules being connected in series to each other between the connecting part and the low-potential-side DC terminal, and
the control command includes a first output voltage command value for the upper arm and a second output voltage command value for the lower arm.

7. The power conversion apparatus according to claim 3, wherein the at least one relay device comprises a plurality of relay device, and the relay circuit board is connected to the plurality of relay devices via a ring-type network.

8. The power conversion apparatus according to claim 3, wherein
the power conversion circuitry includes:
a high-potential-side DC terminal and a low-potential-side DC terminal that are connected to the DC circuit; and
a plurality of leg circuits corresponding to respective phases of the AC circuit and connected in parallel with each other between the high-potential-side DC terminal and the low-potential-side DC terminal,
the plurality of leg circuits each include:
a connecting part connected electrically to a corresponding phase of the AC circuit;
an upper arm including multiple sub-modules among the plurality of sub-modules, the multiple sub-modules being connected in series to each other between the connecting part and the high-potential-side DC terminal; and
a lower arm including multiple sub-modules among the plurality of sub-modules, the multiple sub-modules being connected in series to each other between the connecting part and the low-potential-side DC terminal, and
the control command includes a first output voltage command value for the upper arm and a second output voltage command value for the lower arm.

9. The power conversion apparatus according to claim 2, wherein
the communication circuit board is connected to the predetermined number of sub-modules via a ring-type network,
the path information further includes third information for identifying a channel of the communication circuit board, and
the identification information generator of each sub-module of the plurality of sub-modules generates identification information different from identification information of other sub-modules based on the path information.

10. The power conversion apparatus according to claim 9, wherein the path information further includes fourth information for identifying the relay circuit board.

11. The power conversion apparatus according to claim 9, wherein the at least one relay device comprises a plurality of relay devices, and the relay circuit board is connected to the plurality of relay devices via a ring-type network.

12. The power conversion apparatus according to claim 9, wherein
the power conversion circuitry includes:
a high-potential-side DC terminal and a low-potential-side DC terminal that are connected to the DC circuit; and
a plurality of leg circuits corresponding to respective phases of the AC circuit and connected in parallel with each other between the high-potential-side DC terminal and the low-potential-side DC terminal,
the plurality of leg circuits each include:
a connecting part connected electrically to a corresponding phase of the AC circuit;
an upper arm including multiple sub-modules among the plurality of sub-modules, the multiple sub-modules being connected in series to each other between the connecting part and the high-potential-side DC terminal; and
a lower arm including multiple sub-modules among the plurality of sub-modules, the multiple sub-modules being connected in series to each other between the connecting part and the low-potential-side DC terminal, and
the control command includes a first output voltage command value for the upper arm and a second output voltage command value for the lower arm.

13. The power conversion apparatus according to claim 2, wherein the relay circuit board is connected to a plurality of the relay devices via a ring-type network.

14. The power conversion apparatus according to claim 13, wherein
the power conversion circuitry includes:
a high-potential-side DC terminal and a low-potential-side DC terminal that are connected to the DC circuit; and
a plurality of leg circuits corresponding to respective phases of the AC circuit and connected in parallel with each other between the high-potential-side DC terminal and the low-potential-side DC terminal,
the plurality of leg circuits each include:
a connecting part connected electrically to a corresponding phase of the AC circuit;
an upper arm including multiple sub-modules among the plurality of sub-modules, the multiple sub-modules being connected in series to each other between the connecting part and the high-potential-side DC terminal; and
a lower arm including multiple sub-modules among the plurality of sub-modules, the multiple sub-modules being connected in series to each other between the connecting part and the low-potential-side DC terminal, and
the control command includes a first output voltage command value for the upper arm and a second output voltage command value for the lower arm.

15. The power conversion apparatus according to claim 2, wherein
the power conversion circuitry includes:
a high-potential-side DC terminal and a low-potential-side DC terminal that are connected to the DC circuit; and
a plurality of leg circuits corresponding to respective phases of the AC circuit and connected in parallel with each other between the high-potential-side DC terminal and the low-potential-side DC terminal, the plurality of leg circuits each include:
  a connecting part connected electrically to a corresponding phase of the AC circuit;
  an upper arm including multiple sub-modules among the plurality of sub-modules, the multiple sub-modules being connected in series to each other between the connecting part and the high-potential-side DC terminal; and
  a lower arm including multiple sub-modules among the plurality of sub-modules, the multiple sub-modules being connected in series to each other between the connecting part and the low-potential-side DC terminal, and
the control command includes a first output voltage command value for the upper arm and a second output voltage command value for the lower arm.

16. The power conversion apparatus according to claim 1, wherein
  each sub-module of the plurality of sub-modules further includes an information communicator to transmit, to the control device via the relay apparatus, abnormality determination information indicating whether the sub-module has abnormality or not,
  the control device calculates a number of normal sub-modules among the plurality of sub-modules based on the abnormality determination information of the sub-module, and transmits the number of normal sub-modules to the sub-module via the relay apparatus, and
  the number of sub-modules to be controlled is the number of normal sub-modules.

17. The power conversion apparatus according to claim 16, wherein the information communicator receives a first communication frame including the path information, during an initial setting period of the sub-module, and receives a second communication frame including the control command, during an operation control period of the sub-module.

18. The power conversion apparatus according to claim 16, wherein
  the power conversion circuitry includes:
    a high-potential-side DC terminal and a low-potential-side DC terminal that are connected to the DC circuit; and
    a plurality of leg circuits corresponding to respective phases of the AC circuit and connected in parallel with each other between the high-potential-side DC terminal and the low-potential-side DC terminal,
  the plurality of leg circuits each include:
    a connecting part connected electrically to a corresponding phase of the AC circuit;
    an upper arm including multiple sub-modules among the plurality of sub-modules, the multiple sub-modules being connected in series to each other between the connecting part and the high-potential-side DC terminal; and
    a lower arm including multiple sub-modules among the plurality of sub-modules, the multiple sub-modules being connected in series to each other between the connecting part and the low-potential-side DC terminal, and
  the control command includes a first output voltage command value for the upper arm and a second output voltage command value for the lower arm.

19. The power conversion apparatus according to claim 1, wherein
  the power conversion circuitry includes:
    a high-potential-side DC terminal and a low-potential-side DC terminal that are connected to the DC circuit; and
    a plurality of leg circuits corresponding to respective phases of the AC circuit and connected in parallel with each other between the high-potential-side DC terminal and the low-potential-side DC terminal,
  the plurality of leg circuits each include:
    a connecting part connected electrically to a corresponding phase of the AC circuit;
    an upper arm including multiple sub-modules among the plurality of sub-modules, the multiple sub-modules being connected in series to each other between the connecting part and the high-potential-side DC terminal; and
    a lower arm including multiple sub-modules among the plurality of sub-modules, the multiple sub-modules being connected in series to each other between the connecting part and the low-potential-side DC terminal, and
  the control command includes a first output voltage command value for the upper arm and a second output voltage command value for the lower arm.

* * * * *